United States Patent
Lumpkin

(10) Patent No.: US 6,986,322 B2
(45) Date of Patent: Jan. 17, 2006

(54) SQUIRREL PROOF BIRD FEEDER

(76) Inventor: Charles F. Lumpkin, deceased, late of Spotsylvania, VA (US); by Emily Lumpkin, legal representative, 10414 Shaw Dr., Spotsylvania, VA (US) 22553

( * ) Notice: Subject to any disclaimer, the term of this patent is extended or adjusted under 35 U.S.C. 154(b) by 0 days.

(21) Appl. No.: 10/733,854

(22) Filed: Dec. 12, 2003

(65) Prior Publication Data

US 2004/0261726 A1 Dec. 30, 2004

Related U.S. Application Data

(60) Provisional application No. 60/482,851, filed on Jun. 27, 2003.

(51) Int. Cl.
*A01K 39/01* (2006.01)

(52) U.S. Cl. .................... 119/52.3; 119/57.9

(58) Field of Classification Search ............ 119/52.3, 119/57.9, 59, 63; D30/121, 124, 127, 128; 403/299, 300, 360, 361
See application file for complete search history.

(56) References Cited

U.S. PATENT DOCUMENTS

| | | | |
|---|---|---|---|
| 2,277,420 A | 3/1942 | Stanfield | |
| D170,150 S * | 8/1953 | Cowap | D30/128 |
| D174,139 S * | 3/1955 | Sadler | D30/128 |
| 2,891,508 A | 6/1959 | Bower | |
| D244,098 S | 4/1977 | Kilham | |
| 4,030,451 A * | 6/1977 | Miller | 119/57.9 |
| 4,031,856 A | 6/1977 | Chester | |
| 4,102,308 A | 7/1978 | Kilham | |
| 4,188,913 A | 2/1980 | Earl et al. | |
| 4,327,669 A | 5/1982 | Blasbalg | |
| 4,767,088 A * | 8/1988 | Fielder et al. | 248/121 |
| 4,821,681 A * | 4/1989 | Tucker | 119/51.01 |
| 2,968,219 A | 1/1991 | Harris | |
| 5,291,855 A | 3/1994 | Laverty | |
| D360,495 S * | 7/1995 | Sanderson | D30/123 |
| 5,642,687 A | 7/1997 | Nylen | |
| D429,852 S | 8/2000 | Hogarty | |
| 6,401,658 B1 | 6/2002 | Teets | |
| D490,576 S * | 5/2004 | Rich et al. | D30/128 |

OTHER PUBLICATIONS

Oak Run Sutdios, Wind Accents, www.oakrunstudios.com, Jul. 7, 2002.*

* cited by examiner

*Primary Examiner*—Teri Pham Luu
*Assistant Examiner*—Kimberly S. Smith
(74) *Attorney, Agent, or Firm*—Emily H. Lumpkin

(57) ABSTRACT

A bird feeder for preventing squirrels and other type rodent animals from consuming the bird food includes a top convex surface, a bottom convex surface and a concave middle surface. The top and bottom convex surfaces are inverted bowls having equal diameters and depths. The concave middle surface is a non-inverted bowl having a diameter less than the top and bottom inverted bowls, and has a greater depth. The middle bowl holds the bird food for birds to consume. The rim of the middle bowl may serve as a perch for the feeding birds to light upon. The top and bottom inverted bowls serve as protective shields that prevent rodent animals, such as squirrels from reaching the middle bowl. These shields are constructed from a substantially rigid material, having a substantially smooth surface. The smooth surface and the convex shape prevent squirrels or the like from establishing a foothold so that they may consume the bird food.

4 Claims, 3 Drawing Sheets

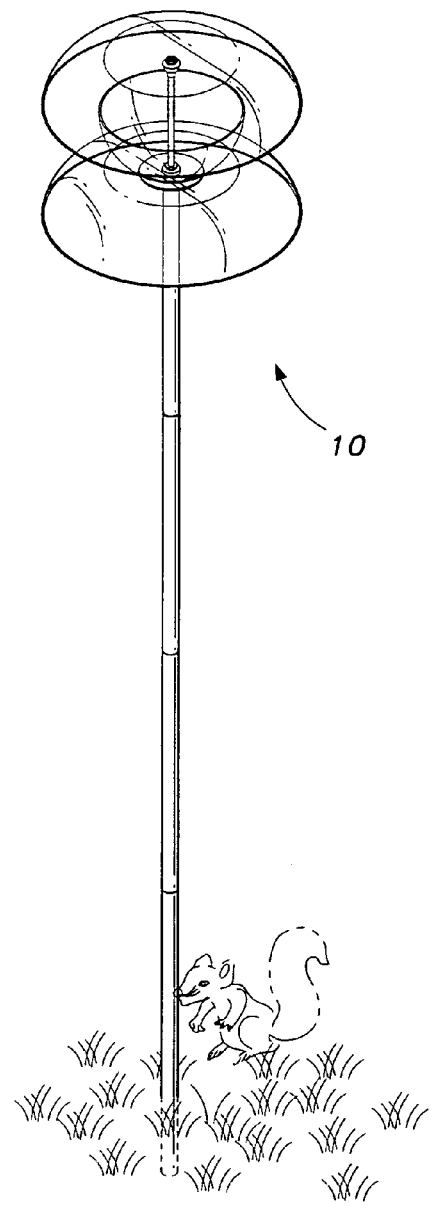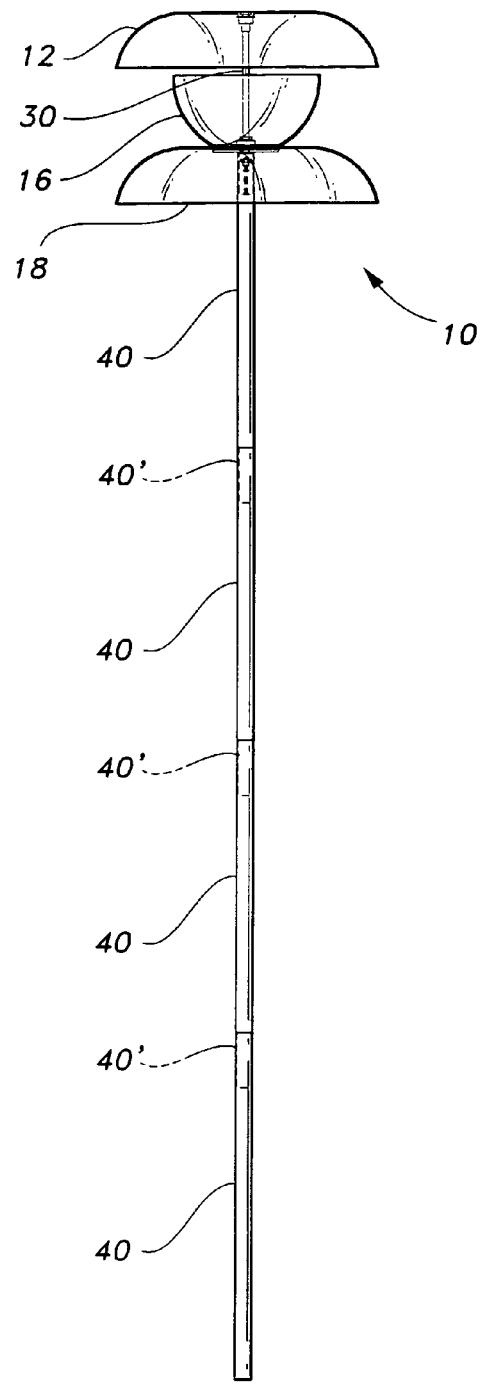
Fig. 1
Fig. 2

SQUIRREL PROOF BIRD FEEDER

CROSS-REFERENCE TO RELATED APPLICATION

This application claims the benefit of U.S. Provisional Patent Application Ser. No. 60/482,851, filed Jun. 27, 2003.

BACKGROUND OF THE INVENTION

1. Field of the Invention

The present invention relates to bird feeders, and more particularly, to bird feeders that protect birds and their food from squirrels and other rodent animals.

2. Description of the Prior Art

In previous attempts to construct wild bird feeders that prevented squirrels, and other rodent animals from attacking the birds and/or getting at their food have had little to no success. Several feeders have tried to prevent squirrels or other rodent animals from acquiring the feed by several mechanical, electrical and electromechanical devices, unfortunately, to no avail. The prior art has provided a myriad of mechanisms that have made many unsuccessful attempts to feed wild birds, without feeding the squirrels and other rodent animals.

U.S. Pat. No. 2,277,420, issued Mar. 24, 1942, to Stanfield; U.S. Pat. No. 2,891,508, issued Jun. 23, 1959, to Bower; U.S. Pat. No. 4,031,856, issued Jun. 28, 1977, to Chester; U.S. Pat. No. 4,102,308, issued Jul. 25, 1978, and U.S. Pat. No. Des. 244,098, issued Apr. 19, 1977, to Kilham; U.S. Pat. No. 4,188,913, issued Feb. 19, 1980, to Earl et al.; U.S. Pat. No. 4,327,669, issued May 4, 1982, to Blasbalg; U.S. Pat. No. 4,968,219, issued Jan. 22, 1991, to Harris; U.S. Pat. No. 5,642,687, issued Jul. 1, 1997, to Nylen et al.; U.S. Pat. No. 5,291,855, issued Mar. 8, 1994, to Laverty; U.S. Pat. No. Des. 429,852, issued Aug. 22, 2000, to Hogarty; and U.S. Pat. No. 6,401,658, issued Jun. 11, 2002, to Teets, are all examples provided by the prior art.

As seen in the prior art, many attempts at keeping squirrels and other rodent animals off of bird feeders have been deficient since squirrels are by nature extremely agile and cunning. Strategies have included a sliding outer sleeve, a spring loaded platform, an other types of obstacles to make it more difficult for the squirrels to reach the bird food. Squirrels often are still able to overcome these types of obstacles and ultimately reach the bird feeder.

SUMMARY OF THE INVENTION

Unlike the prior art bird feeders, it has been found that the only 'sure-fire' static structure that prevents squirrels and other rodent animals from reaching the bird feed is to prevent the animal from establishing a footing that will allow the animal to reach the location of the bird food. Thus, a bird feeder for preventing squirrels and other type rodent animals from consuming the bird food is set forth herein. The bird feeder includes a top convex surface, a bottom convex surface and a concave middle surface. In addition, an assembly for holding the top, middle and bottom surfaces in a predetermined position, as well as, a supporting pole for suspending the bird feeder independently of any other support member, such as a wall, building, tree, etc., is also disclosed.

The top and bottom convex surfaces are inverted bowls having equal diameters and depths. The concave middle surface is a non-inverted bowl having a diameter less than the top and bottom inverted bowls, and has a greater depth. The middle bowl holds the bird food for birds to consume. The rim of the middle bowl may serve as a perch for the feeding birds to light upon. The top and bottom inverted bowls serve as protective shields that prevent rodent animals, such as squirrels from reaching the middle bowl. These shields are constructed from a substantially rigid material, having a substantially smooth surface. The smooth surface and the convex shape prevent squirrels or the like from establishing a foothold so that they may consume the bird food.

The supporting pole is preferably a multi-segmented cylindrical support having nestable ends for selectively defining a height upon which the bird feeder will set. The variations on height are dependent on the length of each segment and the number of segments used. The assembly for holding the bowls together rigidly is a collar for attachment to the top of the pole, an externally threaded shaft, and a plurality of internally threaded fasteners, and bushings for locking the shaft into the collar, and also for locking the bowls into their respective positions. The top inverted bowl and the bottom inverted bowl have a recess for receiving one of the fasteners. This allows these bowls to be interchangeable in position without departing from the scope of the invention. The recess allows the fastener, and a top end of the shaft to be flush with the smooth, top convex surface, prevent any squirrel or other type of rodent animal for hanging onto the top of the bird feeder and ultimately reaching the bird food.

Accordingly it is an aspect of the invention to provide a squirrel, or other rodent animal (herein generally referred to 'squirrel' for sake of description)-proof bird feeder.

It is another aspect of the invention to mount the squirrel-proof bird feeder upon a multi-segmented vertical pole, wherein the segments are nestable.

It is still another aspect of the invention to provide a suitable coupling assembly for holding the bird feeder in an arrangement that prevents squirrels from reaching the bird food.

It is yet another aspect of the invention to provide a support collar, a threaded shaft, and a plurality of thread fasteners and bushings for completing the assembly so as to support the bird feeder in a substantially rigid disposition.

Other and further aspects will be explained hereinafter and are more particularly delineated in the appended claims.

BRIEF DESCRIPTION OF THE DRAWINGS

The features and advantages of the squirrel, and other rodent animal, proof bird feeder of the present invention will be apparent from the following description, taken in conjunction with the accompanying drawings, wherein:

FIG. 1 is a three dimensional environmental view of the present invention.

FIG. 2 is an elevational view of the present invention.

Figure 3:
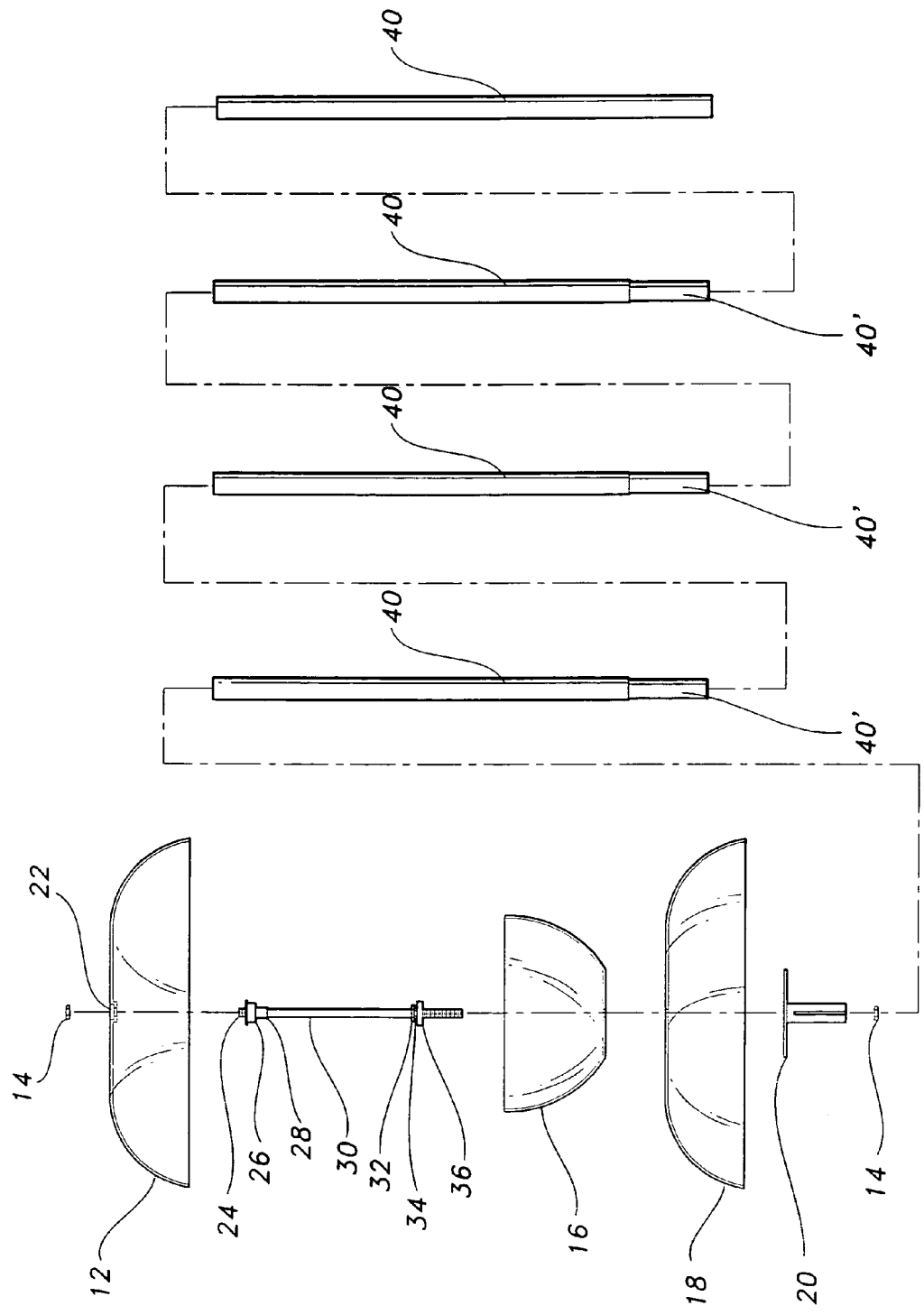
FIG. 3 is an exploded elevational view of the invention.

It is noted that the common elements of the drawings share common reference numerals throughout the following description.

DETAILED DESCRIPTION OF THE INVENTION

Figure 4:
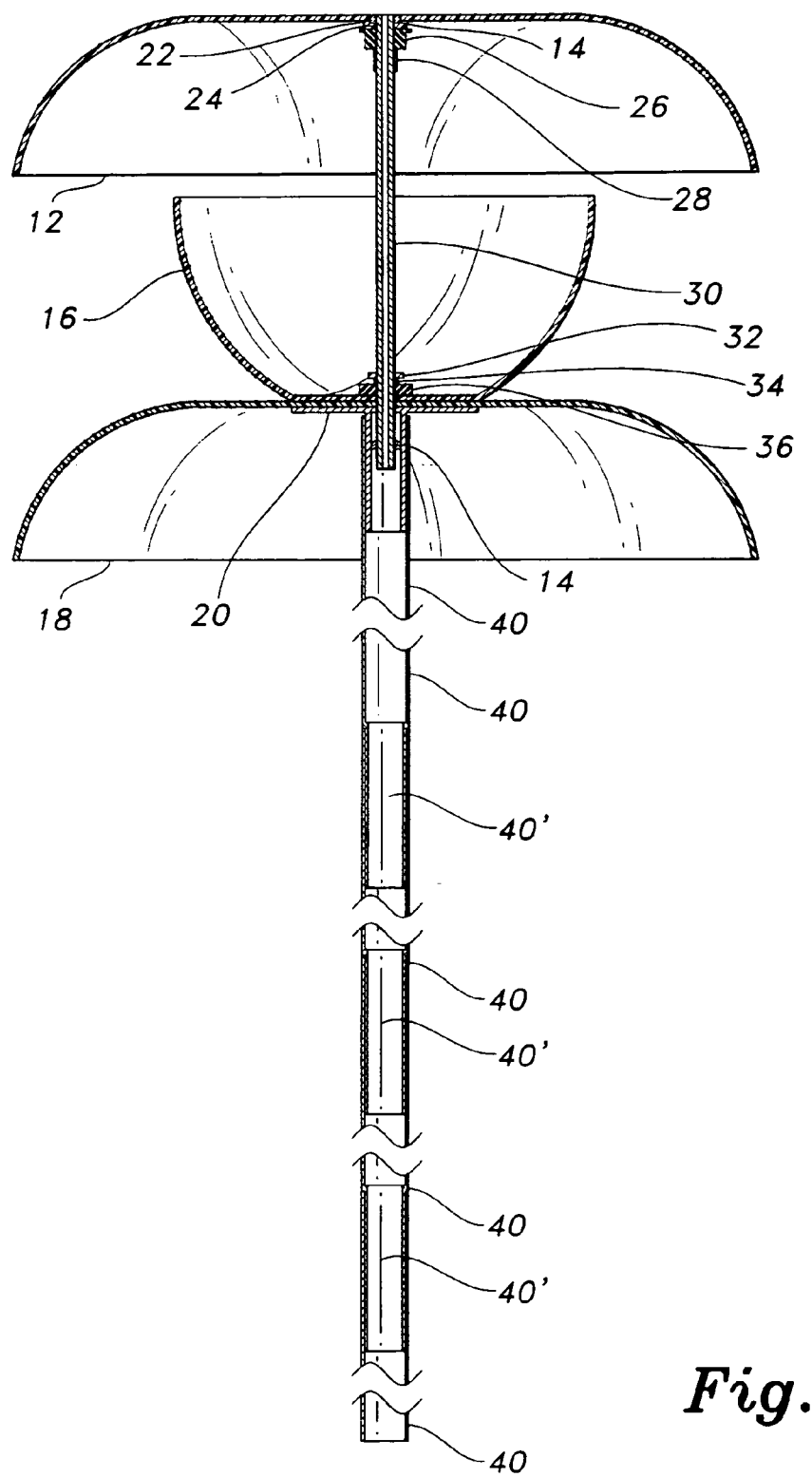
FIG. 4 is an enlarged vertical cross-sectional view of the invention.

Referring to FIGS. 1–4, the squirrel-proof bird feeder is shown, constructed as a freestanding structure. The squirrel or other rodent animal proof bird feeder allows for a great number of wild and colorful birds to feast without interference from other critters. All critters, rodent animals, marauding animals, cats, dogs, and any other animals are herein after referred generally as "squirrels." As seen in FIG. 1, a squirrel is unable to reach the bird foodstuffs located in the bird feeder 10 of the present invention.

The squirrel proof bird feeder 10 has a vertical pole having a plurality of segments 40. Each segment 40 of the pole has a first end 40' and a second end, opposite the first end 40'. The first end 40' has first diameter, and a second end has a second diameter, the second diameter is the diameter of the pole segment 40. The key aspect of the different diameters is that the first diameter nests within the second diameter. The feature allows for various, selective heights of the bird feeder 10. Although the segments 40 have been disclosed as nesting, any mode of coupling the segments 40 together to form the pole is well within the scope of the present invention. In addition, the scope of the invention also includes a single pole, rod, or shaft, so long as it is a freestanding vertical support.

The squirrel proof bird feeder 10 has a first baffle 12, a second baffle 18, a third baffle 16, and a coupling assembly, discussed below. The first baffle 12 and the third baffle 18 are symmetrical. The first baffle 12 and the second baffle 18, each have a generally convex upper surface, a first diameter and a first depth. The upper convex surface of the first and second baffles 12, 18, prevents the squirrel from lighting thereupon, and thus prevents the squirrel from reaching the bird foodstuffs. The first and second baffles 12, 18 have an equal diameter. The diameter is great enough such that a squirrel is unable to reach from the pole to the edge of the baffle 12 from the bottom. Likewise, the squirrel is unable to span across the top of the baffle 18 to reach under the bird foodstuffs. The smooth surfaces of the baffles 12, 18 prevent the squirrel from getting a footing or grasp of the baffles, and consequently the squirrel completely falls from the bird feeder without getting to bird foodstuffs.

The third baffle 16 has a concave upper surface, a second diameter and a second depth is between the first baffle 12 and the second baffle 18. The third baffle 16 is designed and configured to hold foodstuffs for birds, and is concentrically disposed with the first and third baffles 12, 18. The second depth provides both a substantial volume for holding an ample amount of foodstuffs, and creates a suitable perch upon which the birds may sit and feast. The third baffle 16 is basically a bowl, likewise the first and second baffles 12, 18 are inverted bowls. The three baffles 12, 16, 18 are formed of a common substance, such as plastic, metal or stone, so long as the baffles have a smooth surface. Each of the baffles 12, 16, 18 defines a central aperture. The aperture is used for concentrically locating the baffles 12, 16, 18 on the supporting pole segment 40.

A supporting assembly holds the bird feeder together. The supporting assembly includes a T-shaped cylindrical collar 20, and an elongated externally threaded shaft 30. The T-shaped collar 20 has a locking nut 14 for anchoring the collar 20 into the top of supporting pole segment 40. The locking nut 14 be disposed internally or externally of the collar 20. The threaded shaft 30 connects to the collar 20 by a threaded coupling internally of the collar 20. Alternatively, when the locking nut 14 is located within the collar 20, the shaft 30 couples into the locking nut 14.

The top of the shaft 30 has a coupler 28 that forms an end piece 26 at the end of the shaft 30 for engaging the under side of the first baffle 12 t the central aperture. The coupler 28 has a threaded extension 24 that extends through the aperture; however, it does not extend beyond the top surface of the baffle 12. Another locking nut 14 is disposed to engage extension 24 of the coupler 28 at the top of the shaft 30. The locking nut 14 engaging the extension 24 is received into a recessed seat 22 at the aperture of the first baffle 12. The recessed seat 22 allows the extension 24 and the top locking nut 14 to be flush with the upper convex surface of the inverted bowl or first baffle 12. Baffle 18 also includes the recessed seat 22 about the central aperture so the both baffles 12, 18 may be interchangeably located. The end piece 26 of coupler 28 is a flange that supports the first baffle 12 atop the shaft 30. The end piece may include a washer 36 for providing a watertight seal about the coupler 28 and the shaft 30.

Fasteners are provided for engaging the elongated externally threaded shaft 30 for holding the bowl members in position. The fasteners include a plurality of washers 36 locking nuts 32, 34. The washers 36, preferably rubber, serve a two-fold function. First, they form a bushing to prevent mechanical damage to the baffles 12, 16, 18. Second, they provide a watertight seal to protect the foodstuffs from the encroachment of moisture along the shaft 30. Although, in the preferred element, the shaft 30, the locking nuts 14, 32, 34, are metal, it is well noted that the use of plastic or nylon materials are well known materials and are useable as the shaft 30, and locking nuts 14, 32, 34. Likewise, the washers 36 are disclosed as rubber, it is well within the scope of the invention to use any suitable material. The resulting squirrel proof bird feeder of the present invention is aesthetically appealing and extremely functional for preventing squirrels, and other rodent or marauding animals from the birds and bird foodstuffs in the bowl or third baffle 16.

It will be understood that the above described embodiments are for purposes of illustration only and that changes or modifications may be made thereto without departing from the scope and spirit of the invention.

I claim:

1. A squirrel-proof bird feeder comprising:
   a vertical, multi-segment support pole;
   a coupling assembly;
   a first bowl member having an outer convex surface and a base defining a central aperture;
   a second bowl member having an outer concave surface and a base defining a central aperture;
   a third bowl member having an outer convex surface and a base defining a central aperture;
   wherein said coupling assembly positions said first bowl, said second bowl member, and said third bowl member concentrically, such that said first bowl member and said third bowl member are disposed above and below the second bowl member, respectively, said coupling assembly passing through each said bowl member via the central aperture and wherein said coupling assembly includes a T-shaped cylindrical collar, an elongated externally threaded shaft, and a plurality of internally threaded fasteners for engaging said elongated externally threaded shaft for holding each of said bowl members in position.

2. The bird feeder according to claim 1, wherein each said first bowl member and said third bowl member has a recess about said aperture for receiving said internally threaded fasteners; and said T-shaped cylindrical collar receives an end portion of said shaft.

3. The bird feeder according to claim 2, wherein said T-shaped collar is rigidly secured to a top of said multi-segmented pole.

4. The bird feeder according to claim 3, each segment of said multi-segmented pole having a first end portion having a first diameter, and a second end portion having a second diameter, such that said first diameter nests within said second diameter.

* * * * *